W. SHUEY.
AUTOMOBILE REPAIR TRUCK.
APPLICATION FILED OCT. 19, 1912.

1,132,983.

Patented Mar. 23, 1915.
2 SHEETS—SHEET 1.

WITNESSES
Jas. K. McCathran
H. F. Riley

William Shuey, INVENTOR
BY
C. G. Siggers
ATTORNEY

W. SHUEY.
AUTOMOBILE REPAIR TRUCK.
APPLICATION FILED OCT. 19, 1912.
1,132,983.
Patented Mar. 23, 1915.
2 SHEETS—SHEET 2.
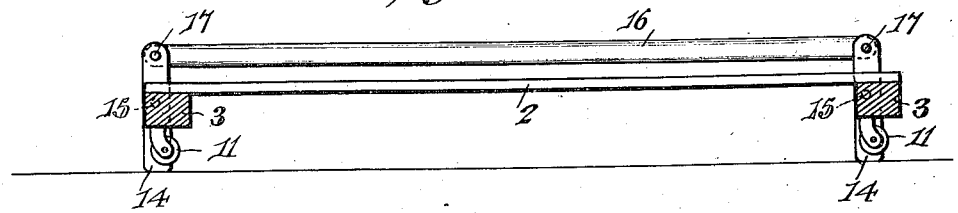
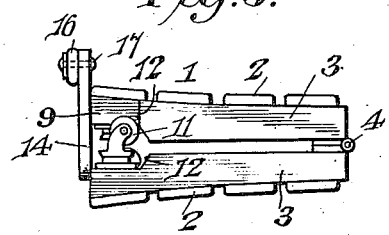
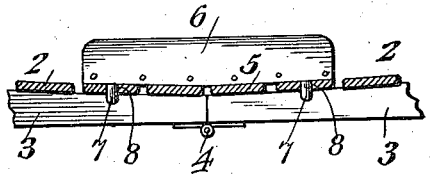
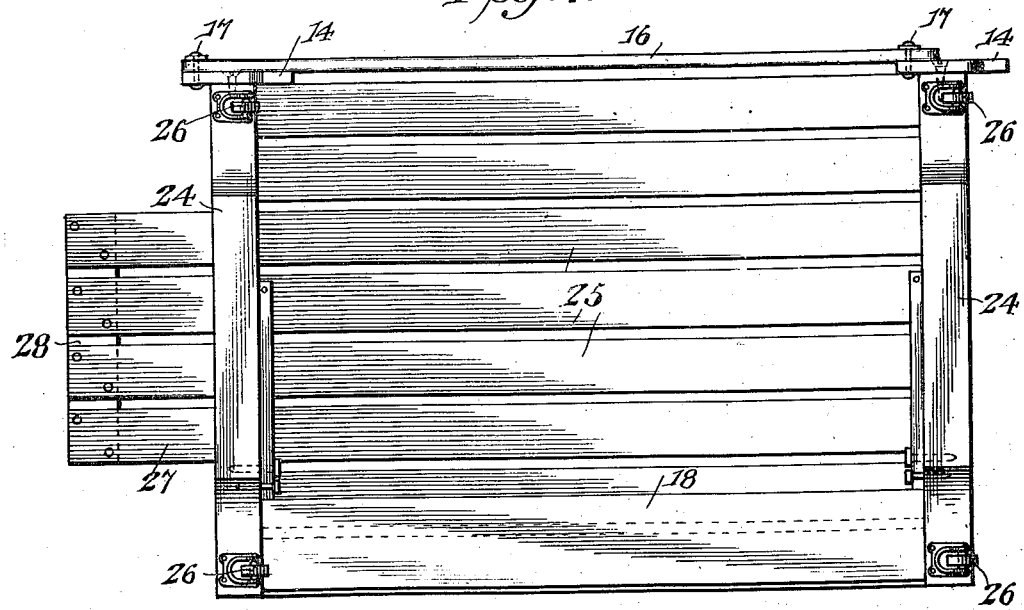
WITNESSES
William Shuey, INVENTOR
BY
ATTORNEY

UNITED STATES PATENT OFFICE.

WILLIAM SHUEY, OF WELLSBURG, WEST VIRGINIA.

AUTOMOBILE REPAIR-TRUCK.

1,132,983. Specification of Letters Patent. Patented Mar. 23, 1915.

Application filed October 19, 1912. Serial No. 726,775.

*To all whom it may concern:*

Be it known that I, WILLIAM SHUEY, a citizen of the United States, residing at Wellsburg, in the county of Brooke and State of West Virginia, have invented a new and useful Automobile Repair-Truck, of which the following is a specification.

The invention relates to a repair truck for automobiles, stationary machinery, etc.

The object of the present invention is to provide a simple, inexpensive and efficient truck, adapted to comfortably support a person while lying beneath an automobile, stationary machinery, or the like when repairing or inspecting the same, and capable of being moved freely by either the hands or feet of a person to change its position, and equipped with easily operated means for holding the truck stationary when it is desired to prevent movement of the same.

A further object of the invention is to provide a truck of this character adapted to be compactly folded when not in use to enable it to be conveniently carried in an automobile or other motor vehicle.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
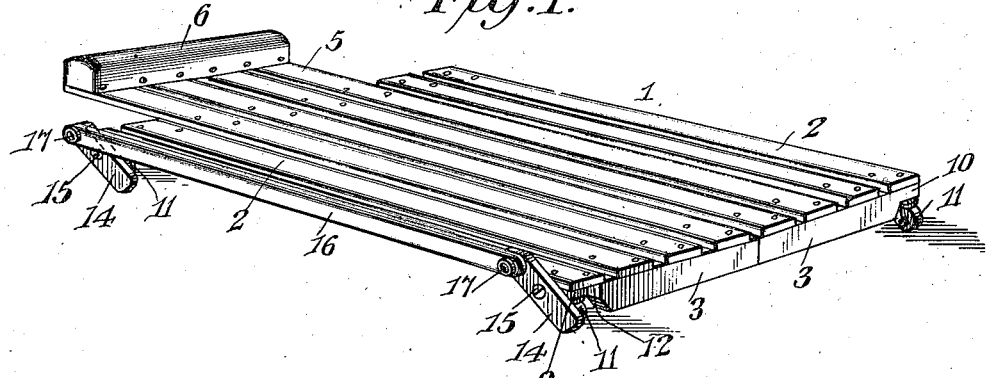
Figure 2:
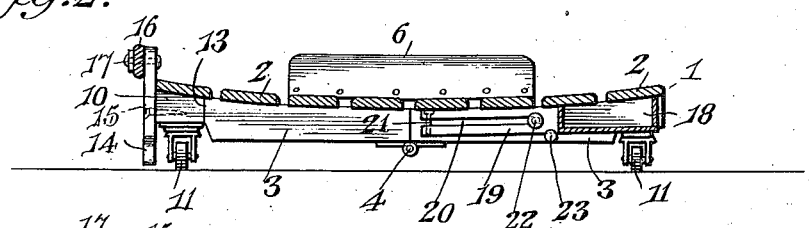
Figure 3:
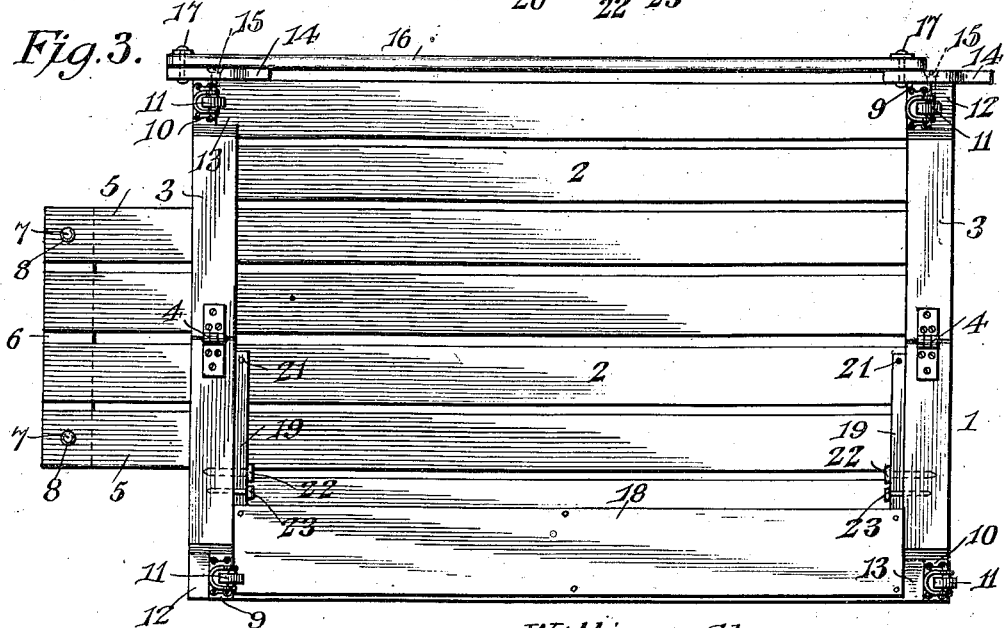

In the drawings:—Figure 1 is a perspective view of a foldable truck, constructed in accordance with this invention. Fig. 2 is a transverse sectional view of the same. Fig. 3 is a reverse plan view. Fig. 4 is a longitudinal sectional view, illustrating the construction for holding the truck stationary. Fig. 5 is an end elevation, the truck being folded. Fig. 6 is a detail sectional view, illustrating the construction for preventing the sections of the body from folding when the truck is in use. Fig. 7 is a reverse plan view, illustrating another form of the invention.

Like numerals of reference designate corresponding parts in all the figures of the drawings.

In the accompanying drawings in which is illustrated the preferred embodiment of the invention, 1 designates the body of the truck, approximately rectangular and divided longitudinally into two foldable sections, and composed of longitudinal slats or bars 2 and transverse connecting bars 3, divided at the center into two side sections, which are connected by hinges 4 secured to the lower faces of the sections of the transverse bars and adapted to permit the body of the truck to break at the center and fold together, as illustrated in Fig. 5 of the drawings. The transverse connecting bars have slightly curved upper faces to receive the slats, which present a concave upper face to the person lying upon the truck.

The slats or bars are extended at one end of the body to form a narrow extension 5, of a width less than that of the truck and supporting a head rest 6 which is adapted to receive the head or neck of a person lying upon the truck. The head rest, which extends transversely across the outer portion of the extension 5, is padded at the upper face and preferably covered with leather, but it may be upholstered with any suitable material and may be constructed in any desired manner. The lower face of the head rest is flat to fit the extension, and it is provided at its end portions with pins or studs 7, which extend through corresponding openings 8 in the slats and prevent the sections of the body from folding. The head rest is removed when it is desired to fold the truck.

The transverse connecting bars are preferably arranged at the ends of the body portion, as shown, and they are provided with reduced terminals 9 and 10 receiving casters 11 and provided with recesses 12 and 13 into which the casters extend when the body of the truck is folded, as clearly illustrated in Fig. 5 of the drawings. The recess 12 is arranged at the outer side of the reduced terminal 9, and the recess 13 is arranged at the inner side of the reduced end 10, the reduced terminals at one side of the body being located opposite the recesses at the opposite side. By this arrangement, the sections of the truck fit snugly together when the body is folded. The casters, which may be of any preferred construction, are equipped with wheels and enable the truck to move freely in any direction.

In order to hold the truck stationary when desired, it is equipped at one side with parallel levers 14 constituting foldable legs and pivoted at an intermediate point by screws 15, or other suitable fastening devices to the adjacent ends of the connecting transverse bars, and connected at their upper ends by an operating bar 16, which enables the levers to be swung into and out of engagement with the supporting surface. The longitudinal operating or connecting bar 16 is pivoted at its ends by rivets 17, or other suitable fastening devices to the levers 14, which are rounded at the lower corners to enable them to be readily engaged with the supporting surface for elevating the adjacent side of the truck to lift the caster wheels of such side clear of the supporting surface. The levers are adapted to be swung in either direction and the supporting or locking device may be mounted at either side of the truck.

The truck is preferably equipped at the opposite side with a slidable tool box 18, provided with inwardly extending arms 19 fitted against the inner side faces or edges of the adjacent sections of the transverse connecting bars and provided with longitudinal slots 20, extending to the inner terminals of the arms and spanned by fastening devices 21, which retain the arms on nails 22, or other suitable fastening devices embedded in and projecting horizontally from the inner side faces of the transverse connecting bars. The inwardly extending arms of the tool box fit against the lower faces of the adjacent longitudinal slats or bars, and they are preferably supported beyond the fastening devices 22 by lower fastening devices 23, receiving the lower edges of the arms and assisting in supporting the tool box in its extended position. The slot and pin connection between the arms and the transverse bars support the tool box beneath the body of the truck and permit the tool box to be readily drawn outwardly to afford access to its contents. When the tool box is moved inwardly beneath the body of the truck, the adjacent slats cover the tool box and confine the contents thereof within the same.

In Fig. 7 of the drawings is illustrated another form of the invention in which the body of the truck is equipped with continuous transverse bars 24, extending entirely across the lower face of the body and rigidly connecting the slats or bars 25. The casters 26, which support the truck, are secured centrally of the terminal portions of the bars 24. The central slats project beyond one of the transverse bars 24 to provide extension 27, which supports a transverse head rest 28 fixed to the extension 27 and extending across the upper face of the same at the outer end thereof.

The truck is equipped at one side with the locking device heretofore described and at the other side with a sliding tool box 18.

What is claimed is:—

1. A foldable truck of the class described comprising a body composed of longitudinal slats, and transverse connecting bars secured to said slats and divided at the center to form two sections, said bars being provided at opposite sides of the body with reduced ends having recesses, the recesses at one side of the body being located in alinement with the reduced ends of the opposite side, hinges connecting the aforesaid sections, and casters mounted on the reduced ends of the said transverse bars and arranged to extend into the said recesses when the body is folded.

2. A truck of the class described including a body, wheels located beneath the corners of the body and supporting the same, and a locking device arranged at the side of the body and composed of levers pivoted at a point intermediate of the ends to the same and having lower portions forming legs and adapted to project below the adjacent wheels to elevate the body, and a longitudinal operating bar pivotally connected to the upper portions of the levers for simultaneously swinging the same.

In testimony, that I claim the foregoing as my own, I have hereto affixed my signature in the presence of two witnesses.

WILLIAM SHUEY.

Witnesses:
PAUL BICKERSTOFF,
CHAS. B. ROBERTS.